United States Patent
Johnston et al.

(10) Patent No.: US 10,236,697 B2
(45) Date of Patent: Mar. 19, 2019

(54) CHARGE STORAGE AND POWER ROUTING FOR DONGLES AND ADAPTERS

(71) Applicant: APPLE INC., Cupertino, CA (US)

(72) Inventors: Peter J. Johnston, San Francisco, CA (US); Neal V. Cecil, Cupertino, CA (US); Robert Il McKeever, San Jose, CA (US); William O. Ferry, San Jose, CA (US); Steven P. Hier, Morgan Hill, CA (US); Clinton Bauder, Sunnyvale, CA (US); Aaron J. Barber, San Jose, CA (US); Reese A. Schreiber, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 553 days.

(21) Appl. No.: 14/987,718

(22) Filed: Jan. 4, 2016

(65) Prior Publication Data

US 2016/0261128 A1   Sep. 8, 2016

Related U.S. Application Data

(60) Provisional application No. 62/129,797, filed on Mar. 7, 2015.

(51) Int. Cl.
*H01M 10/44* (2006.01)
*H01M 10/46* (2006.01)
*H02J 7/00* (2006.01)

(52) U.S. Cl.
CPC .......... *H02J 7/0036* (2013.01); *H02J 7/0052* (2013.01); *H02J 7/0068* (2013.01); *H02J 2007/0062* (2013.01)

(58) Field of Classification Search
CPC ........ H02J 7/355; H02J 7/0042; H02J 7/0004; H02J 7/0052
USPC .......................... 320/107, 111, 114, 115, 128
See application file for complete search history.

(56) References Cited

U.S. PATENT DOCUMENTS

| 6,459,175 | B1 * | 10/2002 | Potega | B60L 11/185 |
| | | | | 307/132 M |
| 2004/0150934 | A1 * | 8/2004 | Baarman | H01F 5/02 |
| | | | | 361/115 |
| 2014/0312691 | A1 * | 10/2014 | Doljack | H02J 7/0036 |
| | | | | 307/29 |
| 2016/0111914 | A1 * | 4/2016 | Willard | H02J 9/061 |
| | | | | 307/66 |

* cited by examiner

*Primary Examiner* — Edward Tso
(74) *Attorney, Agent, or Firm* — Kilpatrick Townsend & Stockton, LLP

(57) ABSTRACT

Circuits, methods, and apparatus where a dongle or adapter may provide continuous power in the event of a disconnection of a charging device. One example may provide a dongle having a charge storage circuit. A charging device connected to the dongle may be used to power an accessory also connected to the dongle. Following a disconnection of the charging device, the dongle may use the charger storage circuit to provide power to the accessory for a first duration. After the first duration, a host device also connected to the dongle may provide power to the accessory via the dongle.

20 Claims, 19 Drawing Sheets

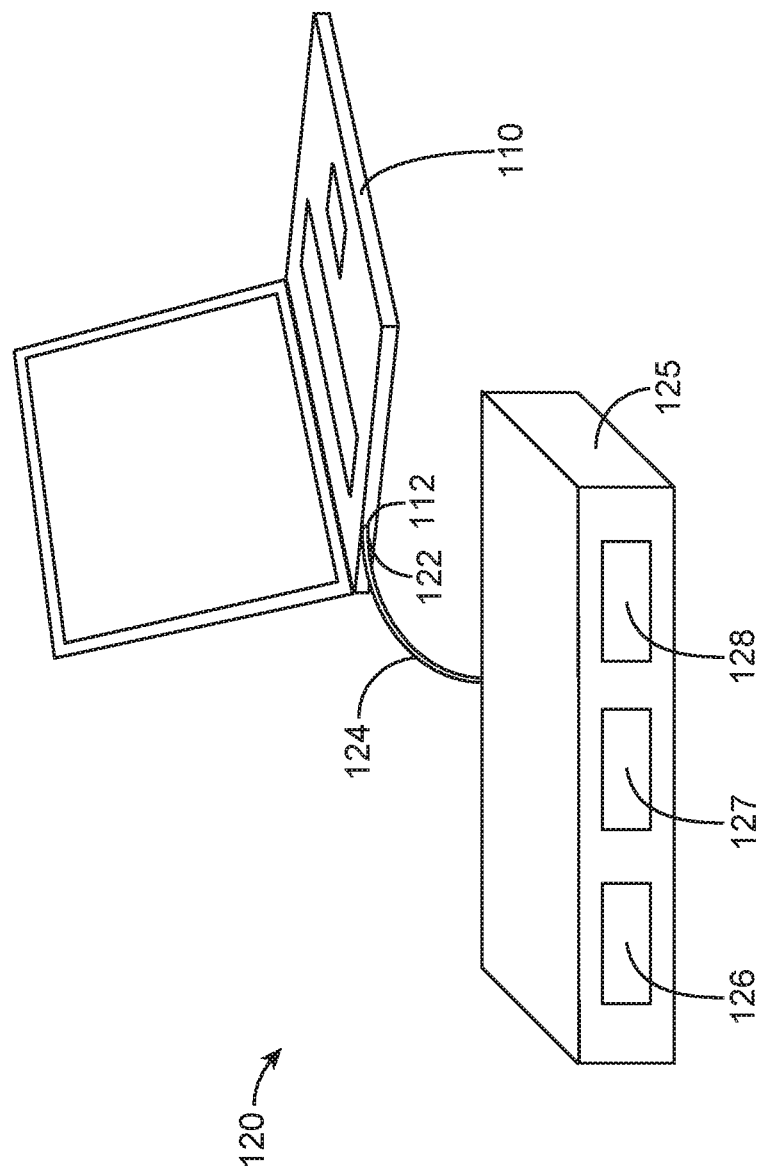

CHARGE STORAGE AND POWER ROUTING FOR DONGLES AND ADAPTERS

CROSS-REFERENCES TO RELATED APPLICATIONS

This application claims the benefit of U.S. provisional patent application No. 62/129,797, filed Mar. 7, 2015, which is incorporated by reference.

BACKGROUND

The types of electronic devices that are commercially available has increased tremendously the past few years and the rate of introduction of new devices shows no signs of abating. Electronic devices, such as tablet, laptop, netbook, desktop, and all-in-one computers, cell, smart, and media phones, storage devices, portable media players, navigation systems, monitors, and others, have become ubiquitous.

The amount of data transferred among these electronic devices has also grown. Large amounts of audio, streaming video, text, and other types of data content are now regularly transferred from one device to another. Power may be transferred with this data, though power may be transferred separately. Power and data may be conveyed over cables that may include wire conductors, fiber optic cables, or some combination of these or other conductors. Cable assemblies may include a connector insert at each end of a cable. The connector inserts may be inserted into connector receptacles in the communicating electronic devices to form pathways for power and data.

In some circumstances, a user may want to connect a device having a first type of receptacle to a cable having a plug that is designed to mate with a second type of receptacle. To do this, the user may need an adapter to form a communication path. An adapter may have a receptacle of the second type to accept the cable and a plug of the first type to mate with the user's device. These adapters may include more than one type of receptacle. A convenient form factor for such a device may be referred to as a dongle.

These dongles may be useful in that they may allow different types of devices to connect to a host using a single receptacle on the host. But a user may connect or disconnect these devices to and from the dongle from time to time. Various problems may arise as these connections and disconnections occur.

Thus, what is needed are circuits, methods, and apparatus to counteract one or more of the various issues that may arise when a user connects or disconnects a device through such a dongle or adapter to a host.

SUMMARY

Accordingly, embodiments of the present invention may provide circuits, methods, and apparatus to counteract one or more of the various issues that may arise when a user connects or disconnects devices through a dongle or adapter to a host or other device. An illustrative embodiment of the present invention may address a circumstance where a charger providing power to an accessory is disconnected from the dongle. Embodiments of the present invention may provide circuits, methods, and apparatus where a dongle or adapter may provide continuous power to an accessory in the event of a disconnection of the charging device.

An illustrative embodiment of the present invention may provide a dongle having a charge storage circuit. A charging device connected to the dongle may be used to power an accessory also connected to the dongle. Following a disconnection of the charging device, the dongle may use the charge storage circuit to provide power to the accessory for a first duration. The dongle may also signal a host device connected to the dongle that the charger has been disconnected. After the first duration, the host device may provide power to the accessory via the dongle. This arrangement may be used to provide continuous power to the accessory in the event of a disconnection of the charger.

Various dongles provided by embodiments of the present invention may have different form factors. An illustrative embodiment of the present invention may provide a dongle having a plug to mate with a host device. The plug may be connected to a housing by a cable. The housing may include one or more various receptacles. In an illustrative embodiment of the present invention, the plug may be a Universal Serial Bus type C (USB-C) plug compatible with a USB-C receptacle, though other types of plugs may be used. The receptacles on the housing may include one or more USB-C and other USB receptacles, receptacles for video connections, and other types of receptacles. One or more USB-C receptacles may be simplified receptacles intended to support power charging but not data communications.

Various dongles provided by embodiments of the present invention may have different circuit configurations. An illustrative embodiment of the present invention may provide a dongle having a plug to connect to a host device and a first receptacle to connect to a charger. A power supply terminal on the plug may connect to a power supply terminal on the first receptacle. This power supply line may connect to a first terminal of a first switch. A second terminal of the first switch may connect to a first regulator. The first regulator may have an output coupled to a power supply terminal of a second receptacle, where the power supply terminal of a second receptacle may provide power to an accessory. The output of the first regulator may further couple to an input of a charge storage circuit. An output of the charge storage circuit may couple to a first terminal of a second switch. A second terminal of the second switch may couple to the second terminal of the first switch and the input of the first regulator. In this configuration, when power is received at the first receptacle from a charger, the first switch may be closed. This may allow the regulator to receive power from the power supply terminal of the first receptacle. The regulator may then provide power to an accessory over a power supply terminal of the second receptacle. The regulator may also charge the charge storage circuit. Following a disconnect of the charger, the first switch may open and the second switch may close, thereby allowing the charge storage circuit to provide power to the first regulator, such that the first regulator may continue to power to an accessory over a power supply terminal of the second receptacle. After a first duration, the host may be ready to provide power to the power supply terminal in the plug. Accordingly, the first switch may close to connect the power supply terminal in the plug to the first regulator, such that the first regulator may continue to power to an accessory over a power supply terminal of the second receptacle. The second switch may open to disconnect the charge storage circuit, thereby protecting power supply circuitry in the host device.

Embodiments of the present invention may employ various types of charge storage circuits. An illustrative embodiment of the present invention may provide a charge storage circuit that includes a second power supply regulator driving one or more capacitors. To increase the stored charge, the voltage provided by the second regulator may be increased, for example with a buck-boost or other type of boost regulator.

Embodiments of the present invention may employ various signaling schemes to communicate between a host device and a dongle or adapter. An illustrative embodiment of the present invention may provide a host and a dongle that are able to communicate and inform each other that they are capable of performing a quick power supply changeover in the event of a power supply charger disconnection. This communication may also include a negotiation for an amount of power to be provided by the host to the dongle in the event of a power supply charger disconnection, though these negotiations may occur following a power supply charger disconnection. These negotiations may be simply implied by the fact that the host and dongle may each be capable of performing a quick power supply changeover technique according to an embodiment of the present invention in the event of a power supply charger disconnection. Since the host is capable of performing a quick power supply changeover, it may arm an internal power supply regulator such that it may be used to quickly provide power in the event of a power supply charger disconnection. Following a disconnection, the dongle may signal the host that the disconnection has occurred using a bidirectional signal line. The dongle may then power an accessory using charge in its charge storage circuit. After a first duration, the host device may then signal the dongle that the host is ready to provide power. The host may do this by signaling the dongle using the same bidirectional signal line. The dongle may then transition from using power in its charge storage circuit to using power supplied by the host. Again, if needed, the host and dongle may negotiate for an amount of power to be provided by the host to the dongle now that the power supply charger has been disconnected.

Embodiments of the present invention may provide dongles or adapters that may be connected to or between various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices.

These dongles or adapters may include plugs and receptacles that provide pathways for signals that are compliant with various standards such as USB including USB-C, High-Definition Multimedia Interface® (HDMI), Digital Visual Interface (DVI), Video Graphics Array (VGA), Ethernet, DisplayPort, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention may provide connector receptacles and inserts or plugs that may be used to provide a reduced set of functions for one or more of these standards. In various embodiments of the present invention, these interconnect paths provided by these connector receptacles and inserts or plugs may be used to convey power, ground, signals, test points, and other voltage, current, data, or other information.

In various embodiments of the present invention, contacts and other conductive portions of these dongles or adapters may be formed by plating, depositing, stamping, metal-injection molding, machining, micro-machining, 3-D printing, or other manufacturing process. The conductive portions may be formed of stainless steel, steel, copper, copper titanium, phosphor bronze, gold, or other material or combination of materials. They may be plated or coated with nickel, gold, or other material. The nonconductive portions, such as the housings cable insulation, may be formed using injection or other molding, 3-D printing, machining, or other manufacturing process. The nonconductive portions may be formed of silicon or silicone, rubber, hard rubber, plastic, nylon, liquid-crystal polymers (LCPs), or other nonconductive material or combination of materials.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 1 illustrates a portion of an electronic system according to an embodiment of the present invention;

DESCRIPTION OF EXEMPLARY EMBODIMENTS

Figure 2A:
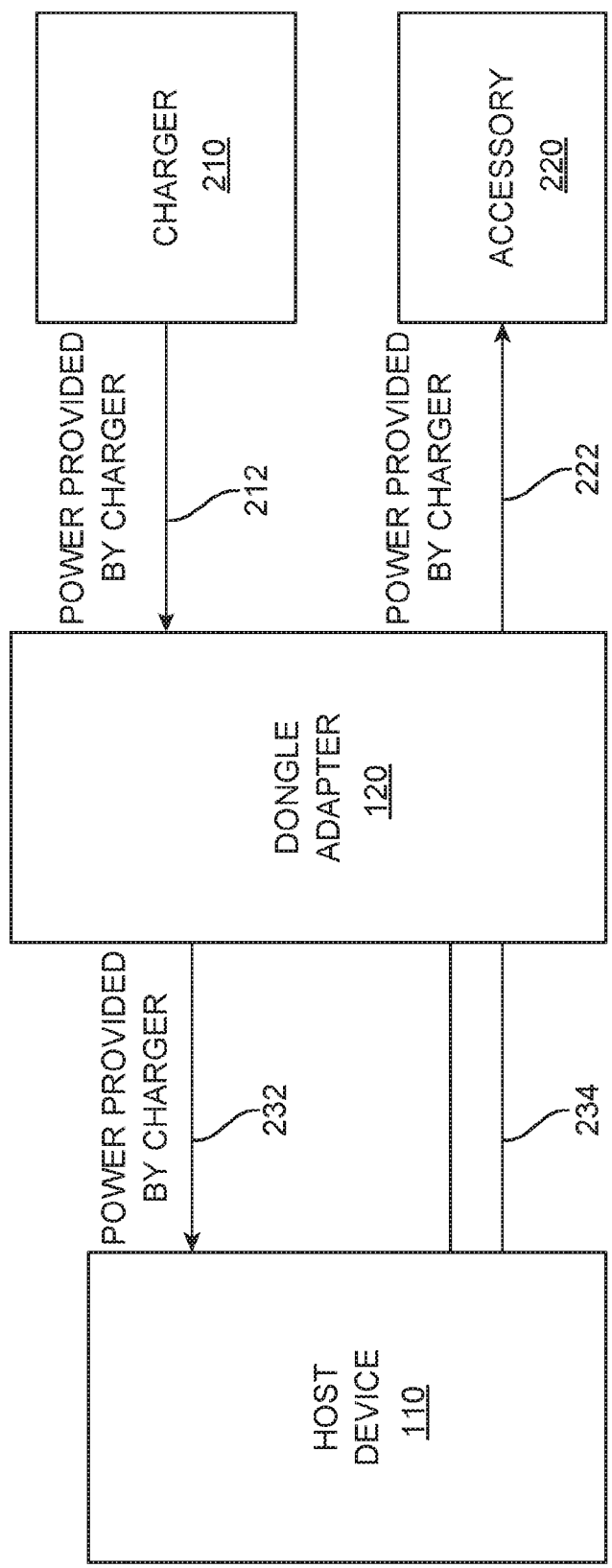
FIGS. 2A-2C illustrate a method of providing power through a dongle according to an embodiment of the present invention.

FIG. 1 illustrates a portion of an electronic system according to an embodiment of the present invention. This figure, as with the other included figures, is shown for illustrative purposes and does not limit either the possible embodiments of the present invention or the claims.

This figure includes a host device 110 connected to a dongle or adapter 120. Host device 110 may be a portable computing device, tablet computer, desktop computer, laptop, all-in-one computer, wearable computing device, cell phone, smart phone, media phone, storage device, portable media player, navigation system, monitor, power supply, adapter, remote control device, or other device. Host device 110 may include a receptacle 112. Receptacle 112 may be a USB-C or other type of receptacle.

Dongle 120 may include a plug 122 that may be connected to a housing 125 through a cable 124. Plug 122 may be configured to mate with receptacle 112. Plug 122 may be a USB C or other type of plug. Housing 125 may include one or more receptacles 126, 127, and 128 for receiving connections to other devices, which are not shown for simplicity. Plug 122 and receptacles 126, 127, and 128, may be various types of plugs and receptacles such as USB-C, HDMI, DVI, VGA, Ethernet, DisplayPort, Thunderbolt, Lightning, JTAG, TAP, DART, UART, clock signals, power signals, and other types of standard, non-standard, and proprietary interfaces and combinations thereof that have been developed, are being developed, or will be developed in the future. These and other embodiments of the present invention may provide connector receptacles and inserts or plugs that may be used to provide a reduced set of functions for one or more of these standards.

In a specific embodiment of the present invention, one of these receptacles may be a USB-C receptacle. This USB-C receptacle may be modified or simplified to accept a plug connected to a charger. For example, receptacle 126 may be a simplified USB-C receptacle that may receive power but may not useful for data transfers. Receptacle 127 may be a video or other type of receptacle, such as an HDMI, DVI, DisplayPort, VGA, Thunderbolt, or other type of receptacle.

Another receptacle, for example receptacle 128, may be a USB-A type receptacle. This USB-A type receptacle may be used to receive a connection from an accessory, such as a mass storage unit or other type of accessory.

Accordingly, the electronic system shown in this figure may be connected to a charger via receptacle 126, and a mass storage unit, such as a hard disk drive, via receptacle 128. In this configuration, power from the charger received at receptacle 126 may be provided to the mass storage unit via receptacle 128 and to the host device 110 via plug 122.

An issue may arise when the charger connection is removed from receptacle 126. Specifically, the source of power for an accessory connected to receptacle 128 may be removed. If this accessory does not have its own power source, power may be removed from the accessory and the accessory may cease functioning. This may be particularly troublesome if a charger is removed from receptacle 126 while a data transfer is taking place between host device 110 and a mass storage unit connected to receptacle 128. This may lead to a loss of data, which may lead to user dissatisfaction.

Accordingly, embodiments of the present invention may provide a dongle 120 that is capable of providing power to an accessory coupled to receptacle 128 following a disconnect of a charger at receptacle 126. Dongle 120 may provide power for a short duration until host device 110 is able to provide power via plug 124 to the accessory connected to receptacle 128. An example of this is shown in the following figures.

Figure 2B:
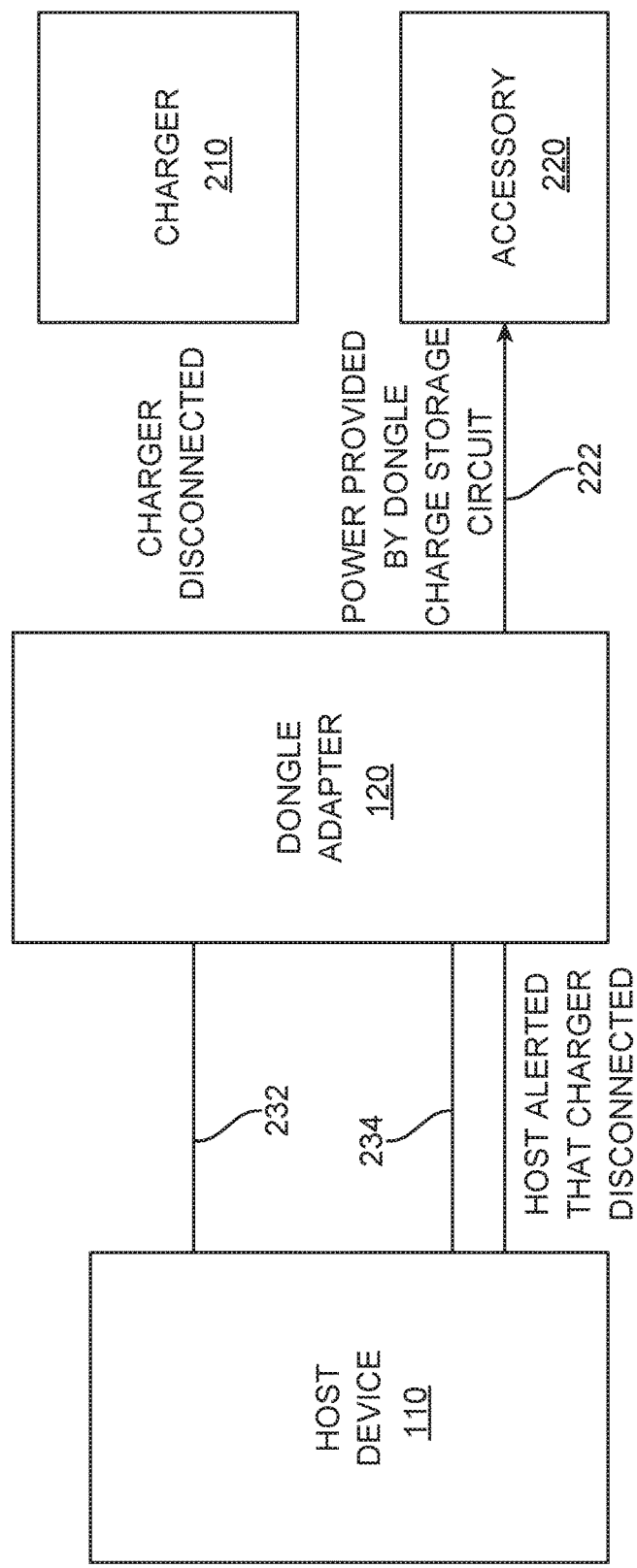
Figure 2C:
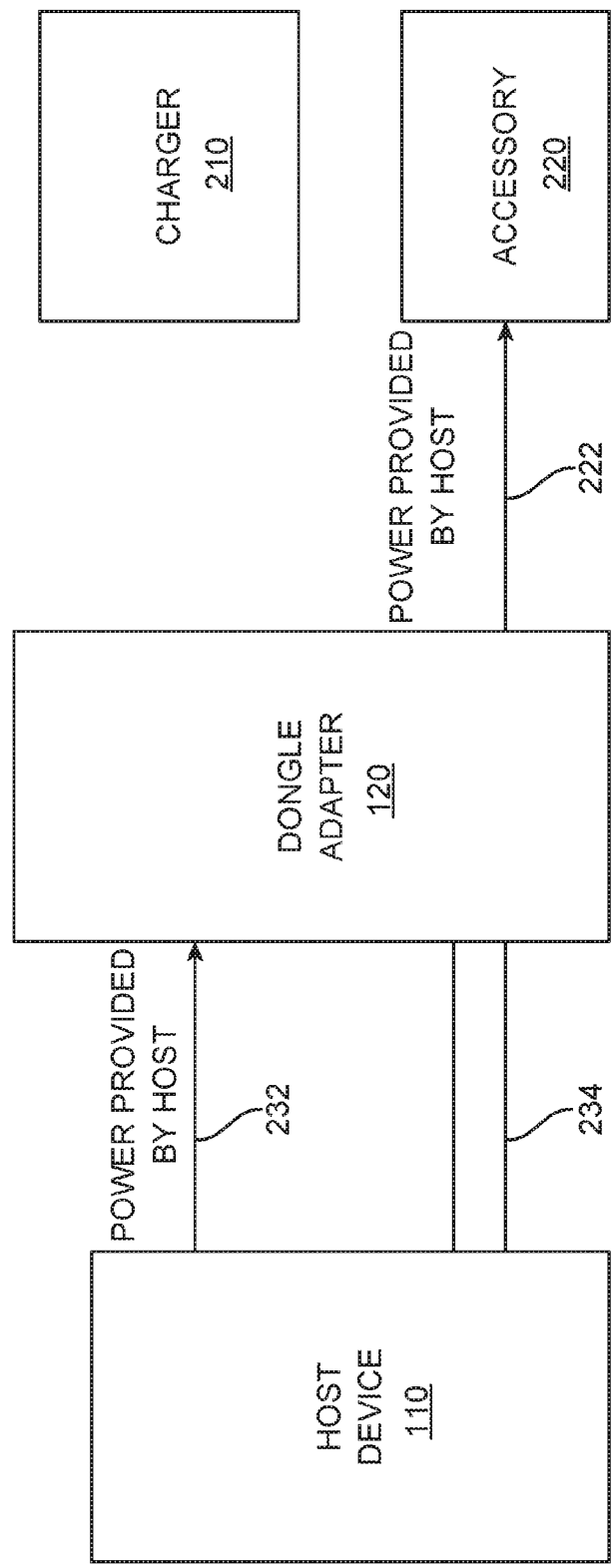

FIGS. 2A-2C illustrate a method of providing power through a dongle according to an embodiment of the present invention. In FIG. 2A, charger 210 may provide power to dongle 120 and via lines 212. Dongle 120 may in turn provide the charger power to host or device 110 over lines 232 and to accessory 220 over lines 222. Control signals on lines 234 may be inactive at this time.

In FIG. 2B, charger 210 may be disconnected from dongle 120. This disconnection may result when a user extracts a plug connected to charger 210 from receptacle 128. This disconnection may occur inadvertently, for example during a power failure, or when someone trips over cable attached to the charger. A disconnection may also occur when power is removed from the charger 210. At this time, charger 210 is not able to provide power to accessory 220. Also, host device 110 may not react quickly enough to provide power to avoid a power down of accessory 220. Accordingly, embodiments of the present invention may provide a charge storage circuit in dongle 120. This charge storage circuit may provide power to accessory 220 for the period of time after charger 210 is disconnected until host device 110 may provide power to accessory 220. Following the disconnection of charger 210, dongle 120 may alert host device 110 that the charger 210 has been disconnected. This may inform host 110 that it needs to provide power to dongle 120.

In FIG. 2C, power is provided by host device 110 on lines 232 to dongle 120. This power may in turn be provided by dongle 120 to accessory 220 over lines 222. This configuration may provide a seamless transition of power from charger 210 to host or device 110, where for a short transition of power is provided by the charge storage circuit in dongle 120.

Various embodiments of the present invention may employ various types of circuitry in dongle 120. An example is shown in the following figure.

Figure 3A:
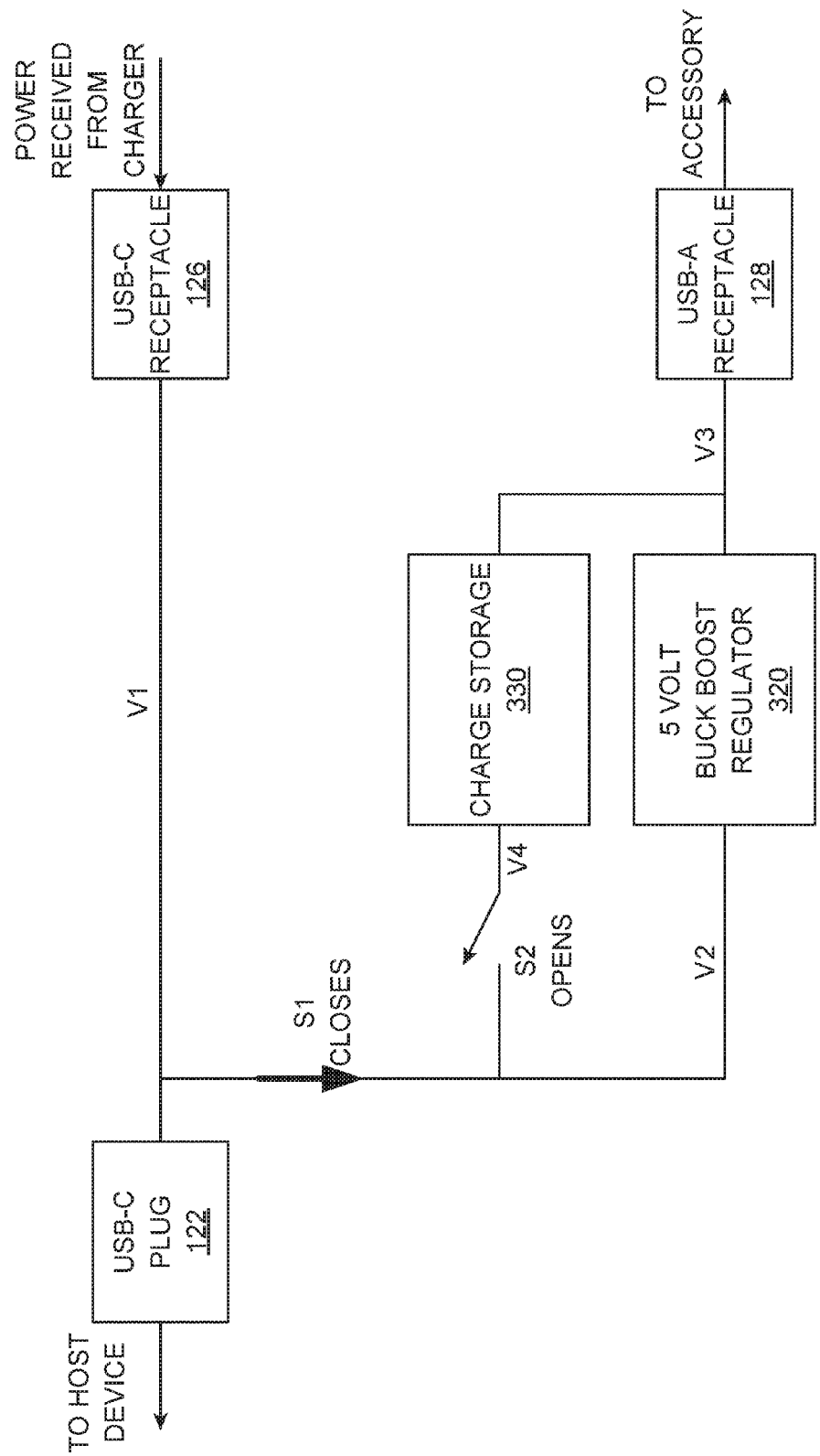
FIGS. 3A-3C illustrates the operation of a dongle circuit according to an embodiment of the present invention.
Figure 3B:
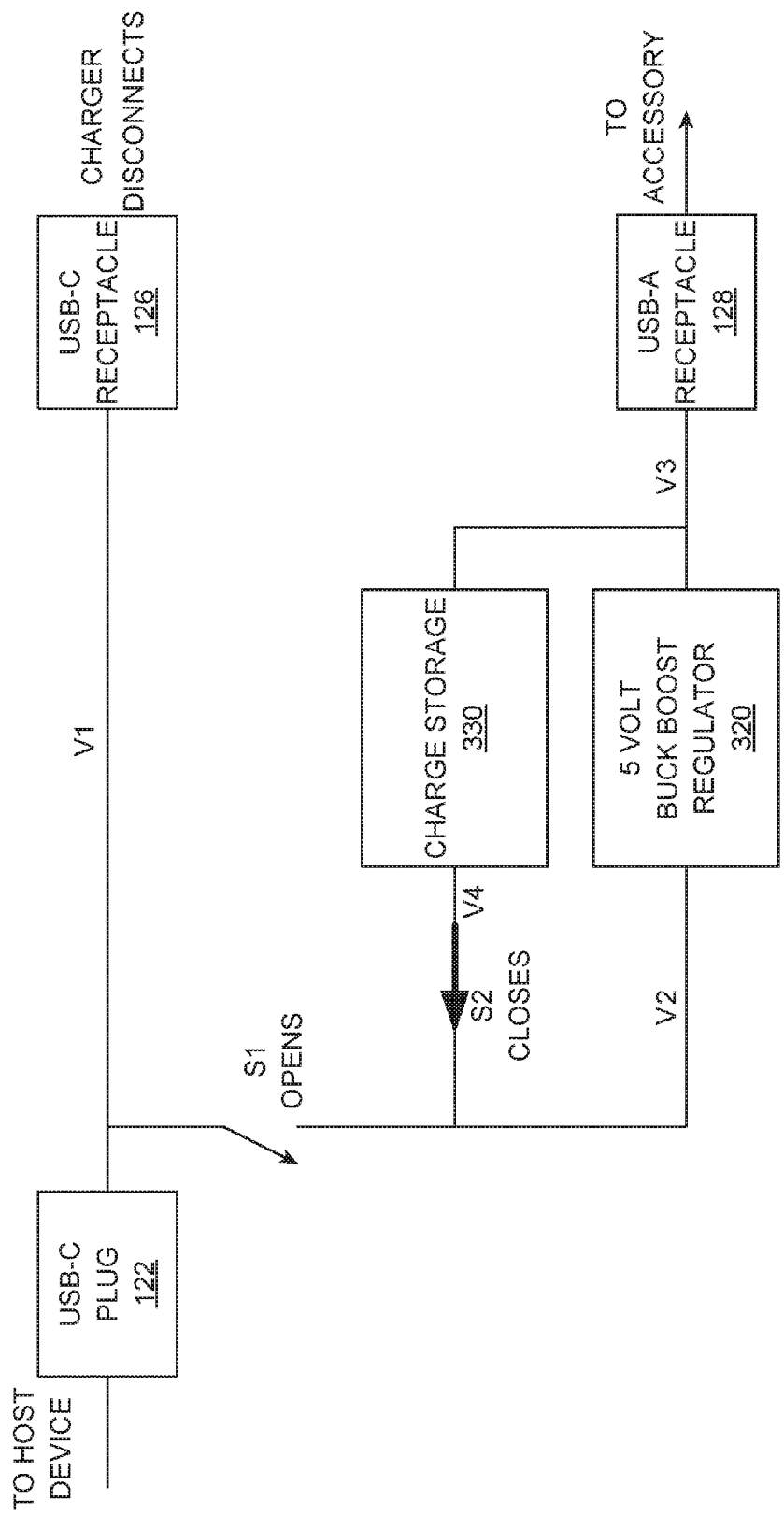
Figure 3C:
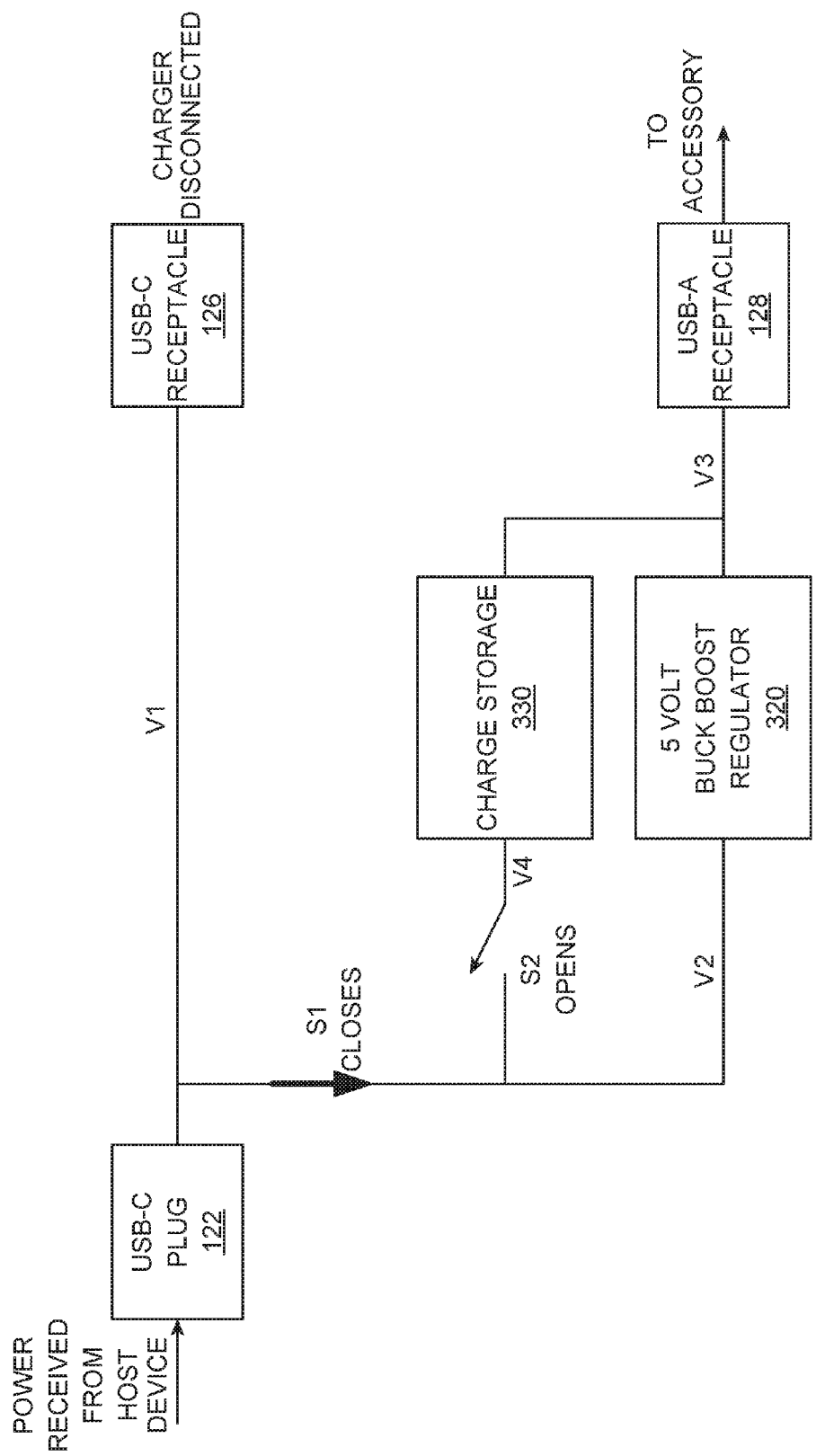

FIGS. 3A-3C illustrates the operation of a dongle circuit according to an embodiment of the present invention. In FIG. 3A, power may be received from a charger at USB-C receptacle 126 and provided to a host device through USB-C plug 122, and to an accessory via USB-A receptacle 128. USB-C plug 122 may have a power supply terminal that is connected on line V1 to a power supply terminal in USB-C receptacle 126. These power supply terminals may be bi-directional power supply terminals. Line V1 may be connected to switch S1. In this configuration, S1 may be closed allowing power on line V1 to drive regulator 320 via line V2. Regulator 320 may provide power on line V3 to a power supply terminal in USB-A receptacle 128. This power may then be delivered to accessory (not shown.) Regulator 320 may also provide power to charge storage circuit 330. Charge storage circuit 330 may be charged so that is ready when needed following a disconnection or other cessation of reception of power from the charger. The output of charge storage circuitry 330 on line V4 may be isolated by switch S2, which may be open at this time. Regulator 320 may be a buck-boost regulator or other type of regulator.

In FIG. 3B, the charger is disconnected from USB-C receptacle 126. Again, this disconnection may be a physical disconnection, or it may be that power has been removed from the charger. At this time, power is no longer available from the charger, and power is not yet available from the host device to power the accessory connected to USB-A receptacle 120.

Accordingly, switch S1 may open and switch S2 may close. This may connect the output of charge storage circuitry 320 to regulator 320 over line V2. Regulator 320 may then provide power on line V3 to USB-A receptacle 128, and thus to the accessory.

In FIG. 3C, power may be received from a host device via USB-C plug 122. At this time, the charge storage circuit 330 may be disconnected. Specifically, switch S1 may close allowing power from the host device to reach regulator 320 via a USB-C plug 122. Switch S2 may open thereby disconnecting charge storage circuit 330. As before, regulator 320 may provide power to USB-A receptacle 128, and thereby to the accessory.

Various types of signaling may be used in electronic systems according to embodiments of the present invention. An example is shown in the following figures.

Figure 4A:
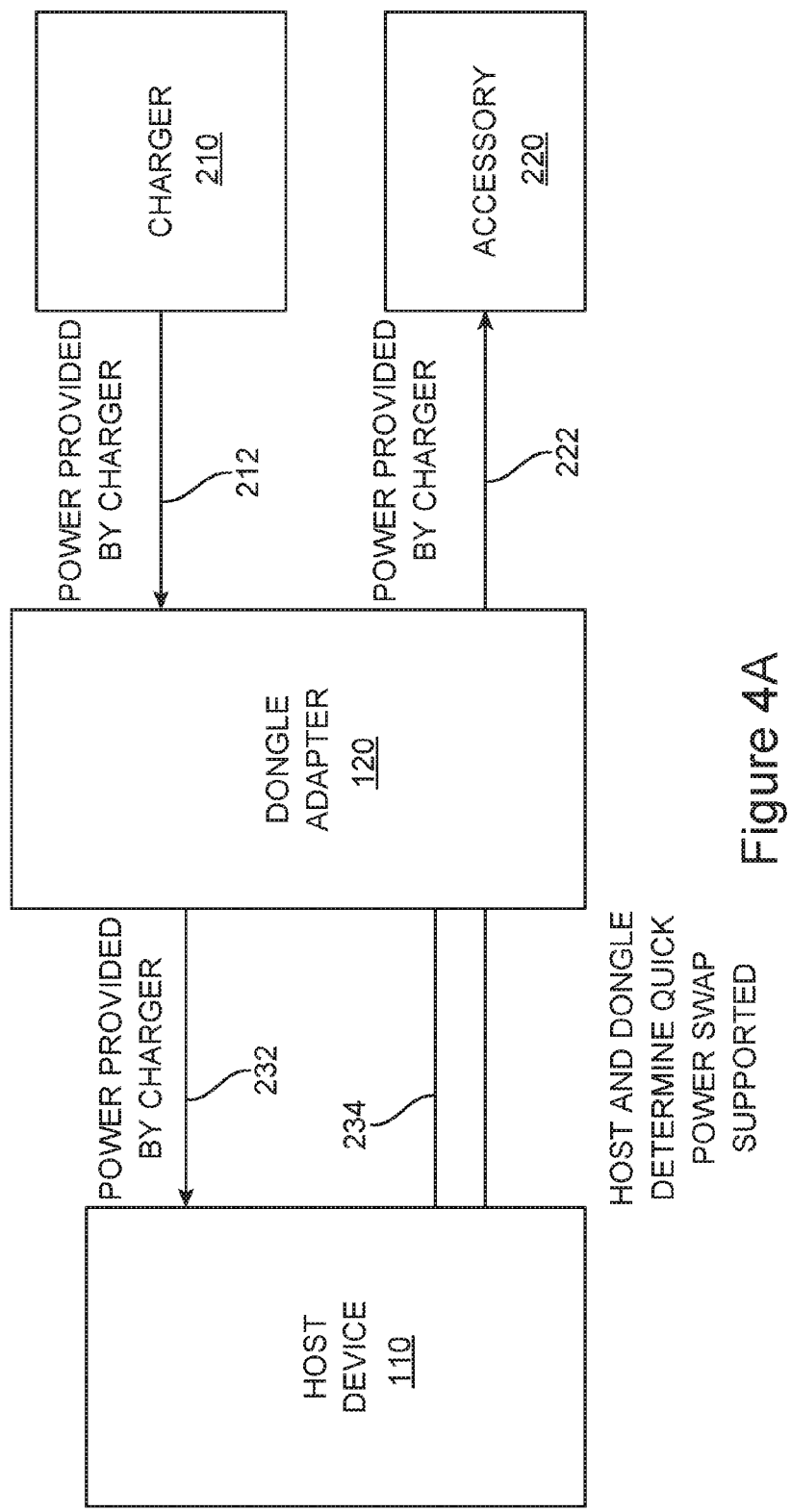
FIGS. 4A-4F illustrates a method of signaling between devices according to an embodiment of the present invention.

FIGS. 4A-4F illustrates a method of signaling between devices according to an embodiment of the present invention. In FIG. 4A, dongle 120 is connected to host device 110. Dongle 120 is further connected to receive power from charger 210 and to provide power to accessory 220. Specifically, charger 210 may provide power to dongle 120 over lines 212. Dongle 120 may further provide this power to host device 110 over lines 232 and to accessory 220 over lines 222. During this initial setup, the host in dongle may determine using one or more control lines 234 that they are each capable of supporting a quick power swap technique provided by an embodiment of the present invention. At this time, the devices may further negotiate for a level of power that host 110 would provide to dongle 120 in the event of a disconnection by charger 210. In other embodiments of the present invention, these further negotiations may be delayed until host device 110 actually needs to provide power to dongle 120. In still other embodiments the present invention, a level of power that a host device 110 may provide to dongle 120 may be implied by the fact that they are both capable of supporting a quick power swap technique provided by an embodiment of the present invention. In various embodiments of the present invention, different signals may be used for these negotiations. For example, where a host device 110 and dongle 120 are connected using a USB-C interface, low speed data signal lines D2N and D2P may be used. These signal lines may be used to convey what may be referred to as an SOS signal and a presence signal respectively. The SOS signal may be used by dongle 120 to inform the host that the host needs to provide quickly, hence the name. The presence signal may indicate that dongle 120 is connected to host 110.

Figure 4B:
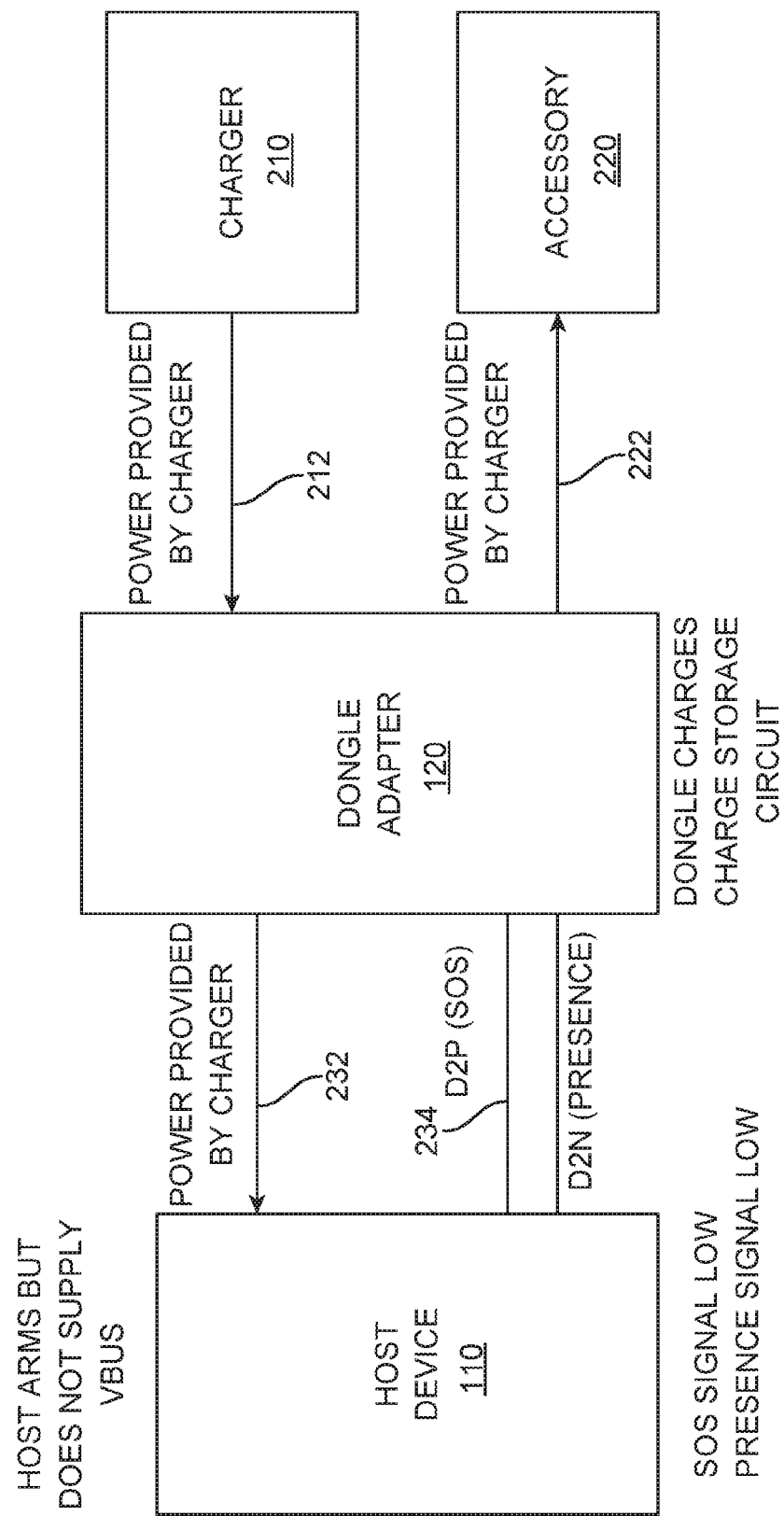

In FIG. 4B, host device 110 may turn on a regulator that may supply power, though this regulator may not be needed at this time, or may only be needed for limited purpose. Also at this time, dongle 120 may charge its charge storage circuit.

Figure 4C:
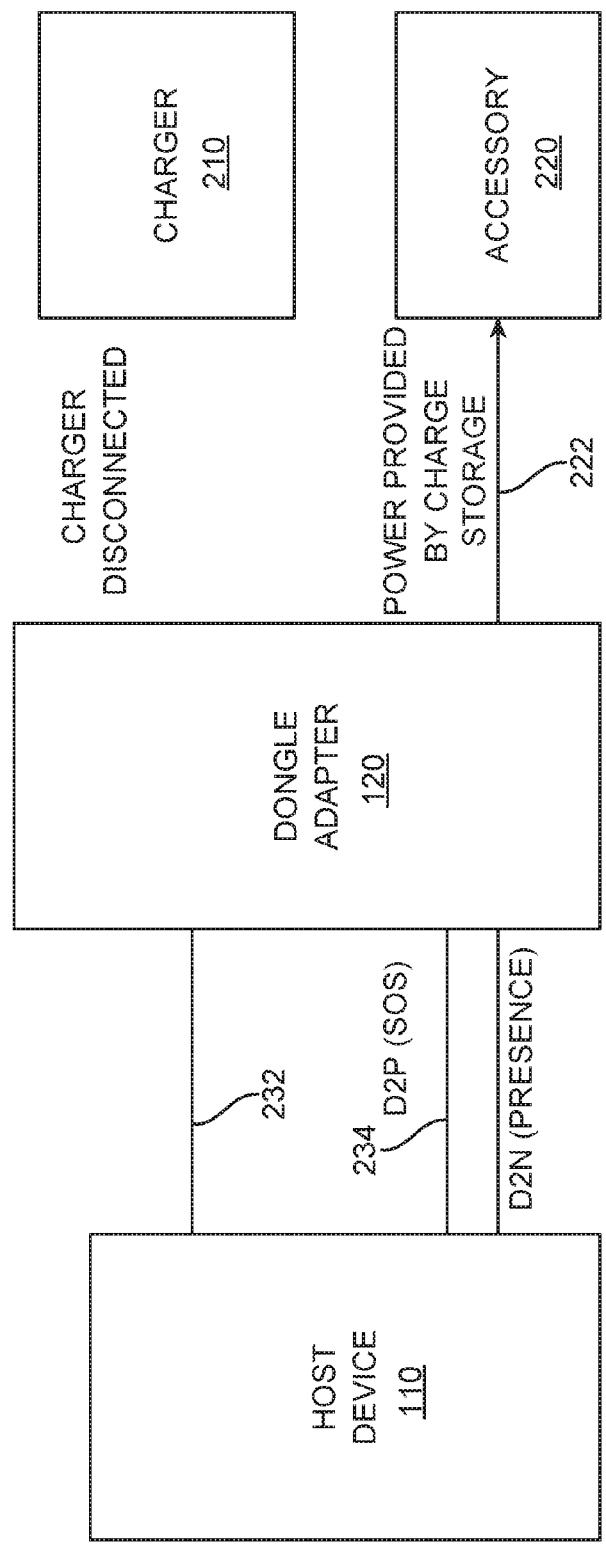

In FIG. 4C charger 210 may be disconnected from dongle 120. Again, this may be a physical disconnection, or it may be that power has been removed from charger 210. At this time, power is not available from charger 210, and host or device 110 has not yet connected its regulator to dongle 120. Accordingly, power may be provided by the charge storage circuit in dongle 120 over lines 222 to accessory 220. At this time, dongle 120 may signal an SOS over lines 234 to host device 110. This SOS signal may be a high signal on line DP2.

Figure 4D:
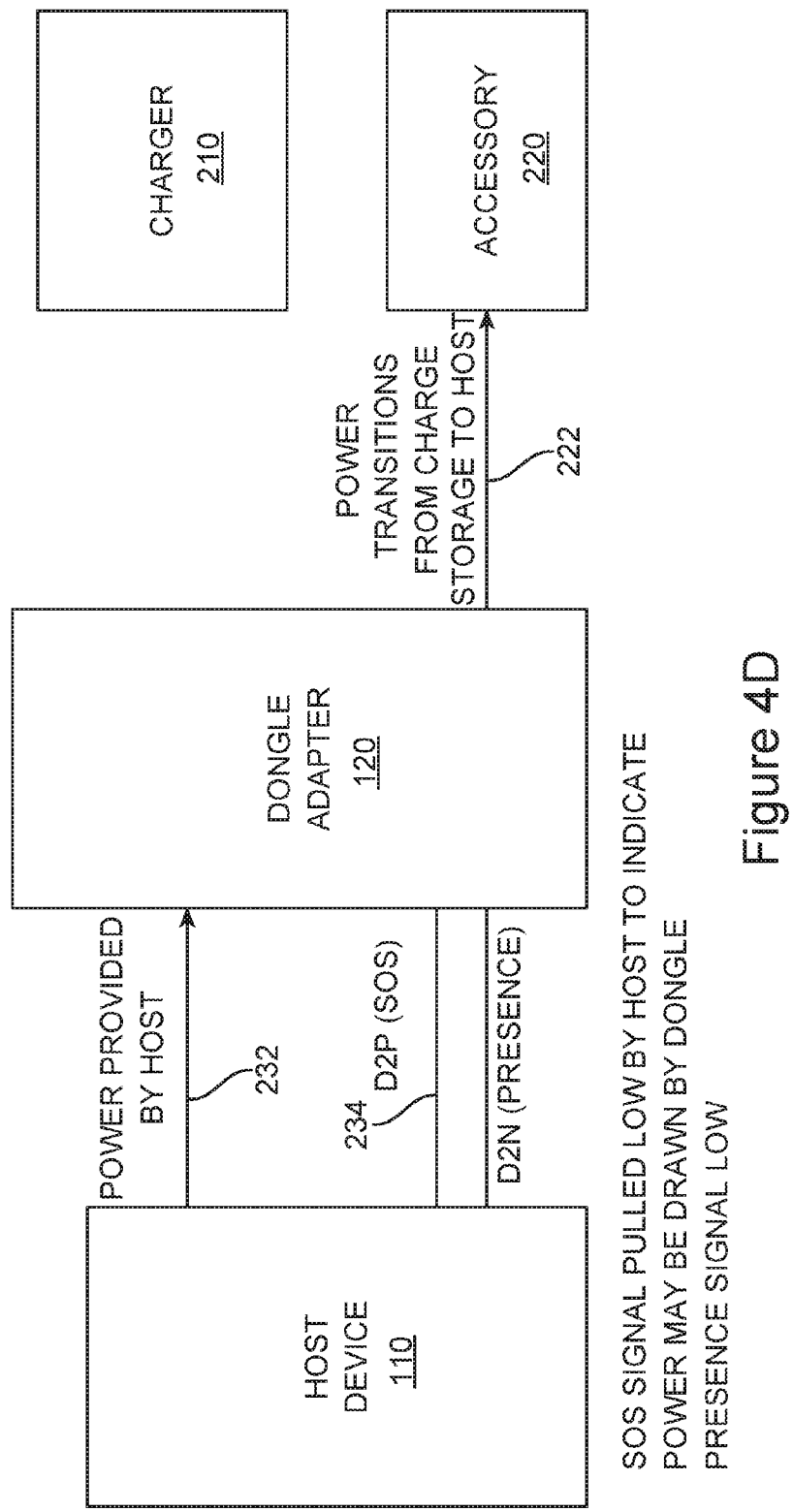

In FIG. 4D, power may be provided by host device 110 to dongle 120 over lines 232. Host device 110 may pull the SOS signal low to indicate that power may be drawn by the dongle 120. Dongle 120 may then transition from providing power from the charge storage circuit to providing power from the host device 110 over lines 222 to accessory 220.

Figure 4E:
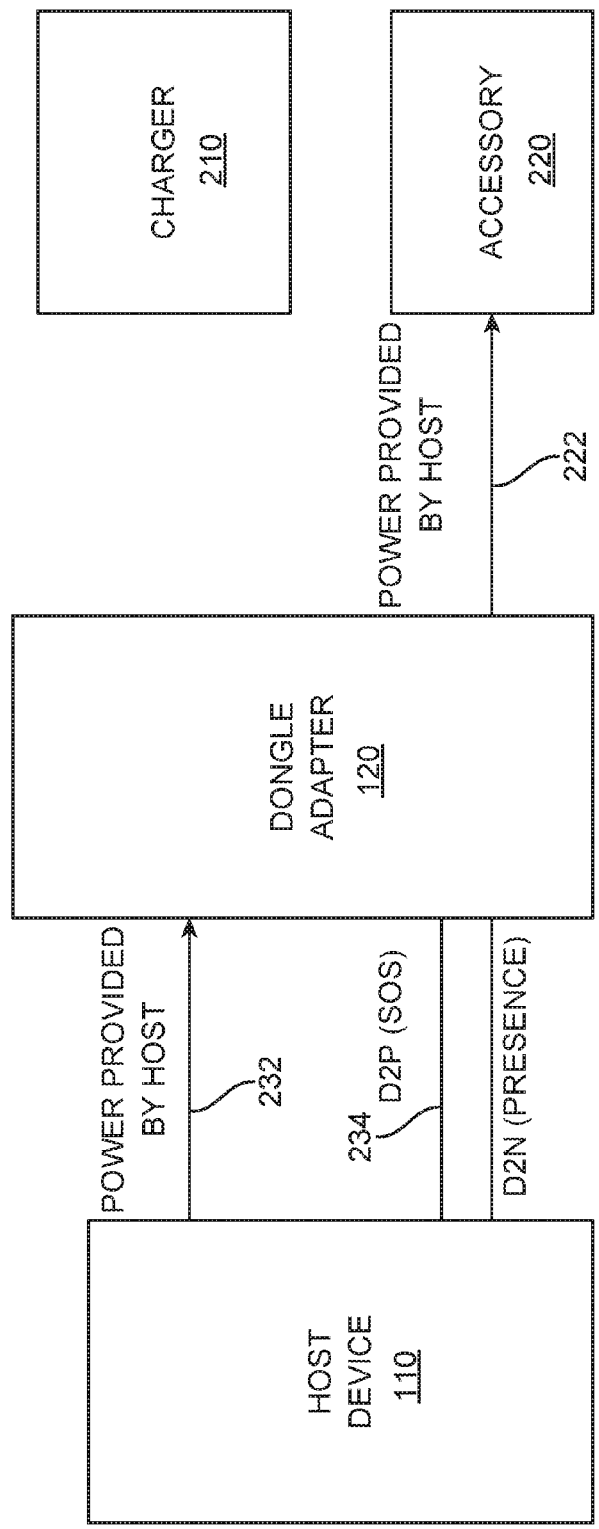

In FIG. 4E, dongle 120 may provide power from the host device 110 over lines 222 to accessory 220.

Figure 4F:
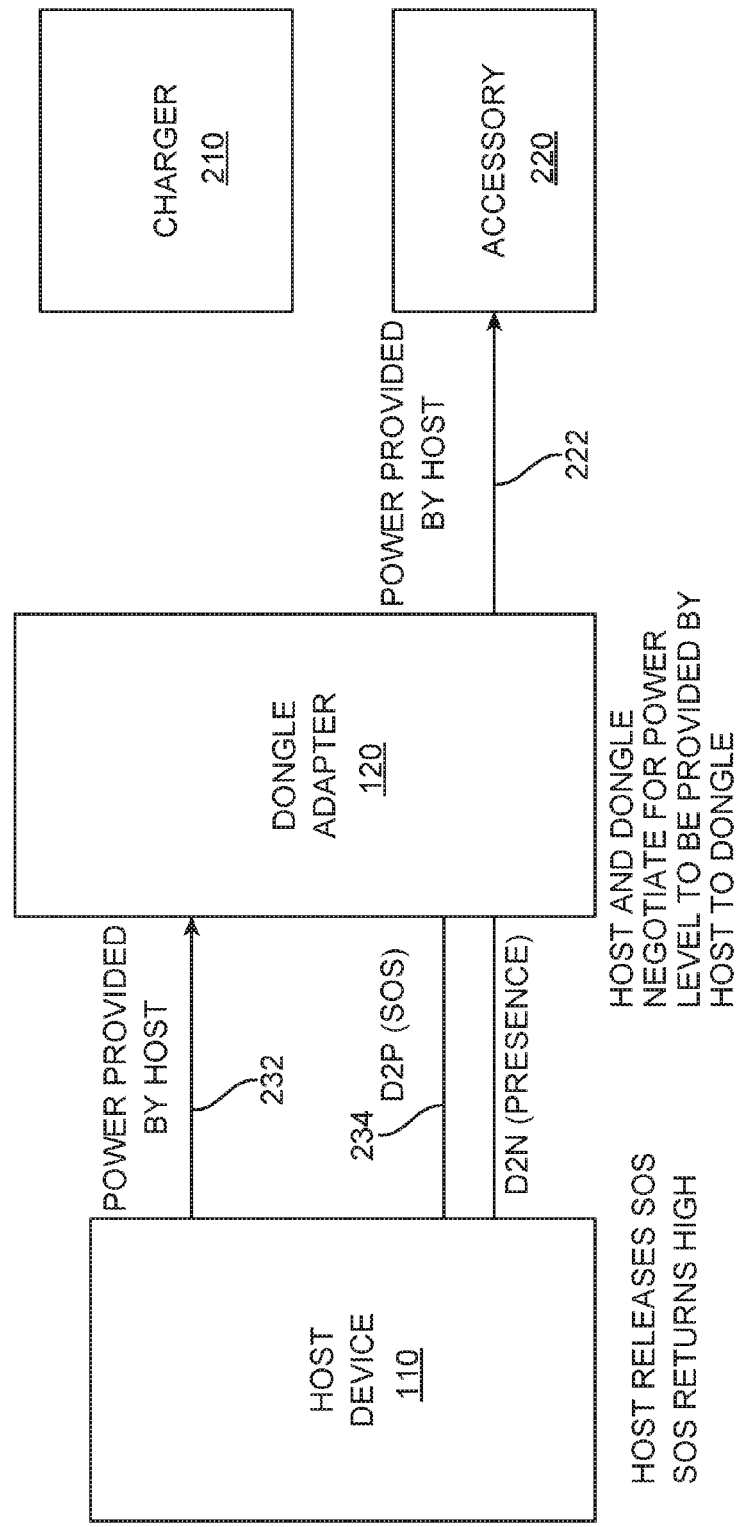

In FIG. 4F, host device 110 may release the SOS signal allowing it to return high. As described above, if they have not done so already, host 110 and dongle 120 may negotiate for a power level to be provided by host 110 to dongle 120.

Again, circuitry in dongle 120 may be implemented in a number of ways. An example is shown in the following figures.

Figure 5:
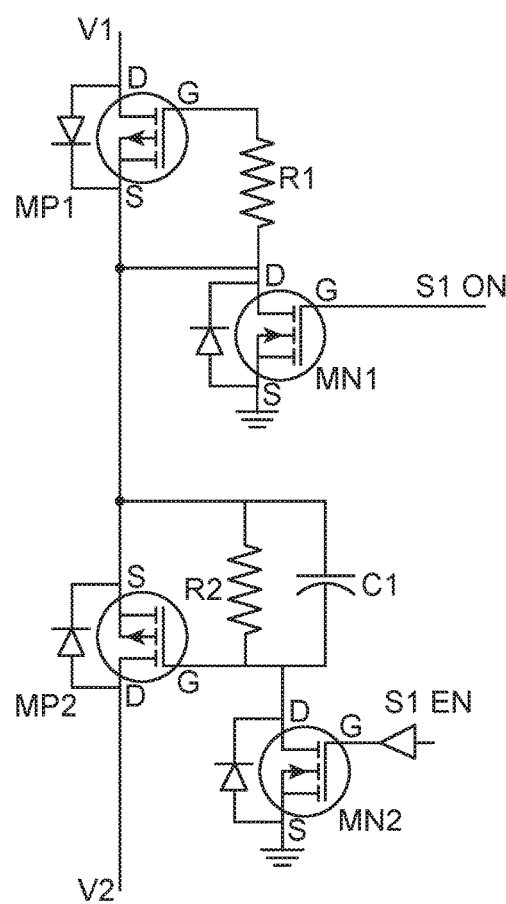
FIG. 5 is a schematic for switch S1 according to an embodiment of the present invention.

FIG. 5 is a schematic for switch S1 according to an embodiment of the present invention. Switch S1 may be formed by 2 p-channel transistors MP1 and MP2 connected in series. A high signal received on line S1 ON may close switch S1. Specifically, transistor MN1 may turn on providing a voltage at the gate of transistor MP1, thereby turning transistor MP1 on. Transistor MN1 may receive and enable signal. When the enable signal is high, transistor MN2 may turn on, thereby providing a voltage the gate of transistor MP2 turning it on, thereby closing switch S1 and completing the connection between terminals V1 and V2.

Figure 6:
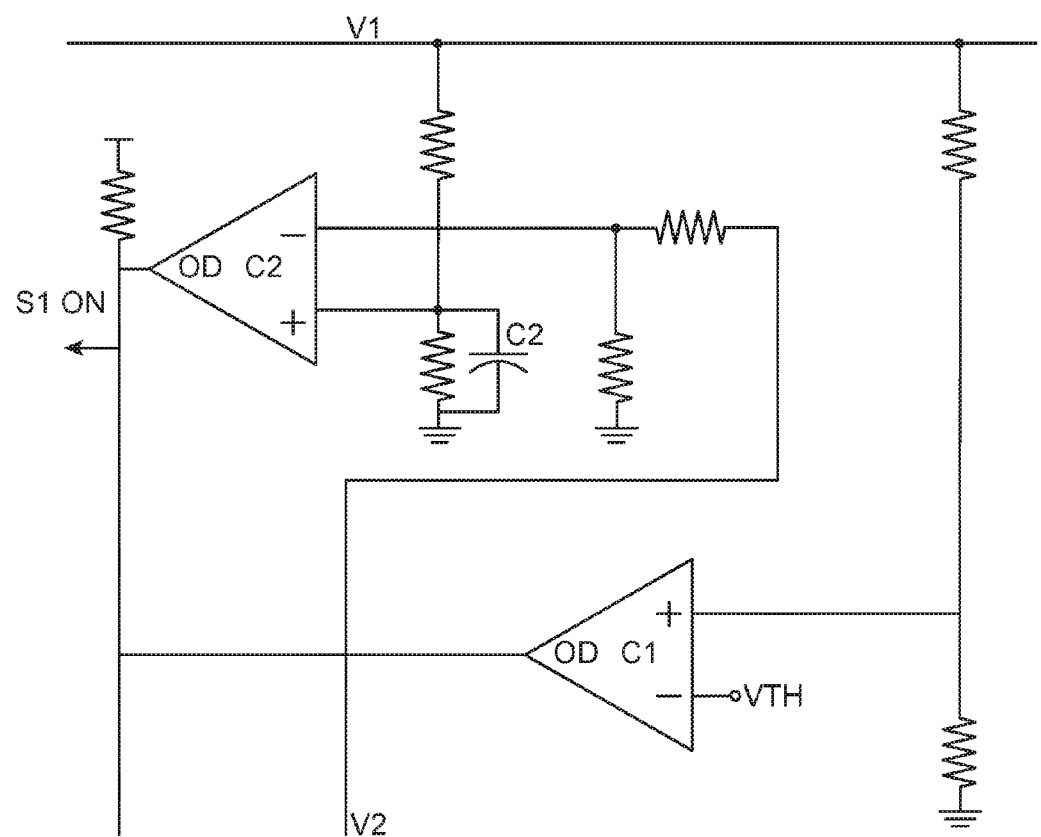
FIG. 6 illustrates control circuitry for opening and closing switch S1 according to an embodiment of the present invention.

FIG. 6 illustrates control circuitry for opening and closing switch S1 according to an embodiment of the present invention. Comparator C1 may compare a portion of a voltage received via charger on line V1 to a threshold voltage. When the portion of the received voltage drops below the threshold voltage, the output of comparator C1 may go low, thereby shutting off or opening switch S1. When the portion of a voltage received via charger on line V1 is higher than the threshold voltage, switch S1 may be on or closed.

In various embodiments of the present invention, it may be a desirable to open switch S1 when a voltage on line V2 is higher than a voltage on line V1. Preventing switch S1 from closing at this time may provide protection by preventing switch S1 from connecting a high voltage at the output of the charge storage circuit through switch S2 and back into the host device regulator. Accordingly, comparator C2 may be included. Comparator C2 may compare the voltage on line V1 to the voltage on line V2 (or more specifically, portions of these voltages), and when the voltage on line V1 is lower than the voltage on V2, the output of comparator C2 may be low, again turning off or opening switch S1. Capacitor C2 may be included at the positive terminal of comparator C2 to slow the reaction time of the positive input. This may be particularly useful when S1 is on and V1 and V2 are close to the same voltage. If at this time S2 is closed, both inputs to comparator C2 could rise at the same rate and comparator C2 may not properly drive output S1 ON low thereby opening switch S1. By slowing the voltage response at the positive input to comparator C2, a high voltage appearing on V2 may immediately drive the output S1 ON of comparator C2 low, thereby turning off switch S1. In normal operation comparator C1 may have already turned off and opening switch S1 before turning on and closing switch S2, in which case this extra protection may not be activated. In this way, the capacitor C2 may ensure that S1 is not turned on and closed until V2 drops below V1, at which time the host may begin providing power after a power role swap.

Figure 7:
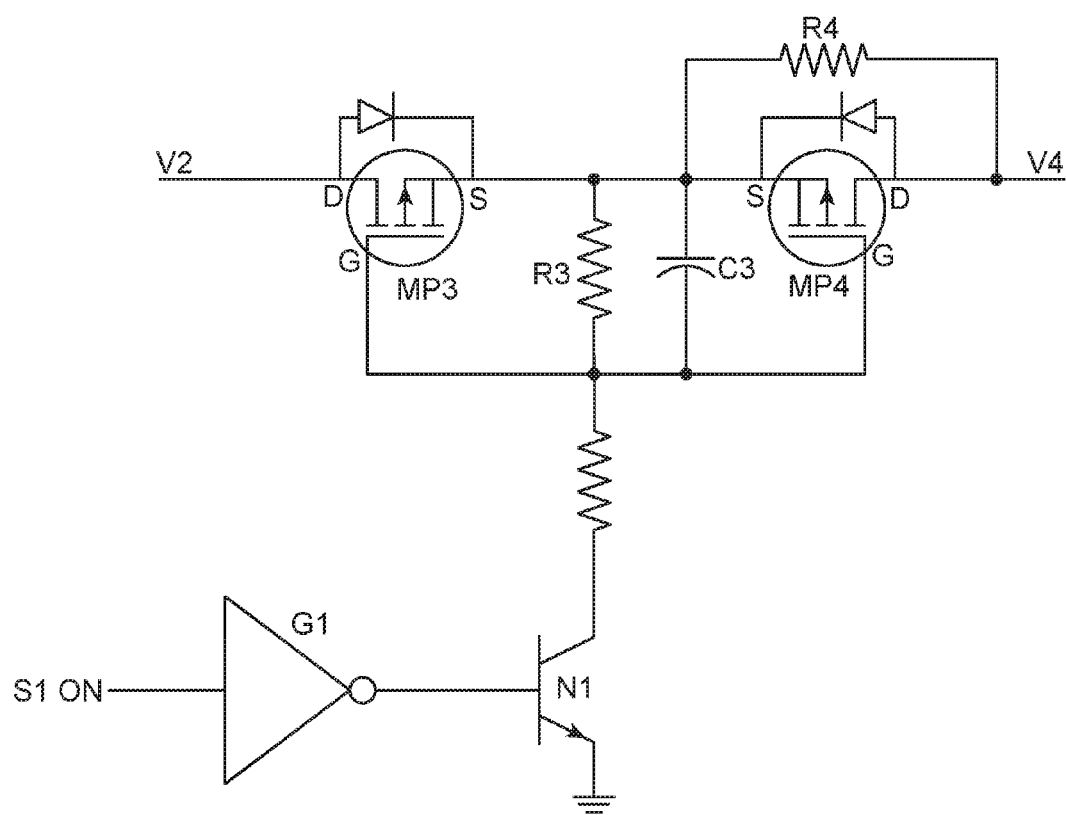
FIG. 7 is a schematic for switch S2 according to an embodiment of the present invention.

FIG. 7 is a schematic for switch S2 according to an embodiment of the present invention. As shown in FIGS. 3A-3C, when switch S1 is closed, switch S2 is open, and when S1 is open, S2 is closed. Accordingly, switch S2 may be driven by an inversion of the S1 ON signal. This inversion may be provided by logic inverter G1. When S1 is closed, signal S1 ON is high, and the output of G1 is low. This signal is received at the base of transistor N1 and the collector of N1 may then rise to V2. With no current flow through the resistor R3, transistors MP3 and MP4 may be off and switch S2 may be open. When switch S1 is open, the signal S1 ON may be low and the output of inverter G1 may be high. This may turn transistor N1 on providing a voltage across resistor R3. This may turn on transistors MP3 and MP4, thereby closing switch S1 between lines V2 and V4.

A capacitors C3 may be included across resistor R3 to slow response times of switch S2. A resistor R4 may be included across transistor MP4. This resistor R4 may be used to limit current provided through regulator 320 when it is initially providing charge to the charge storage circuitry 130.

Figure 8:
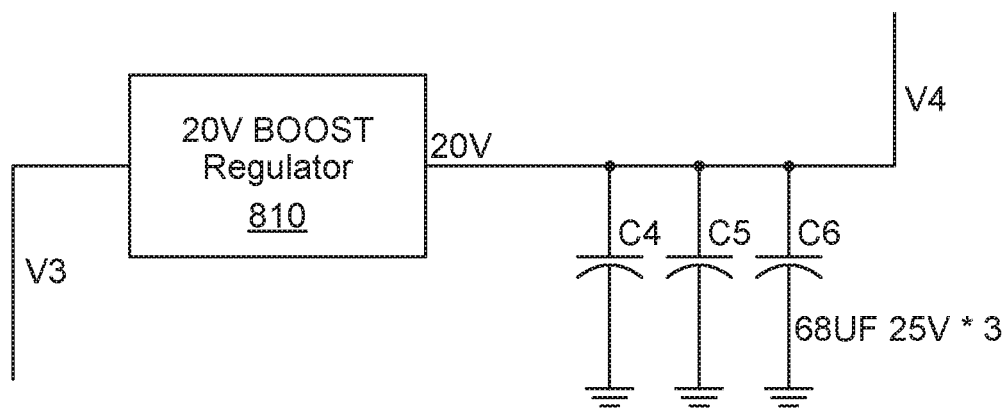
FIG. 8 is a schematic for a charge storage circuit according to an embodiment of the present invention.

FIG. 8 is a schematic for a charge storage circuit according to an embodiment of the present invention. This charge storage circuit may receive power on line V3 from regulator 320. Regulator 810 may boost this voltage to a higher voltage in order to increase the total charge stored on one or more capacitors connected at its output. In this example, three capacitors C4, C5, and C6 are shown, though in other embodiments of the present invention, one, two, or more than three capacitors may be coupled at the output of regulator 810.

Figure 9:
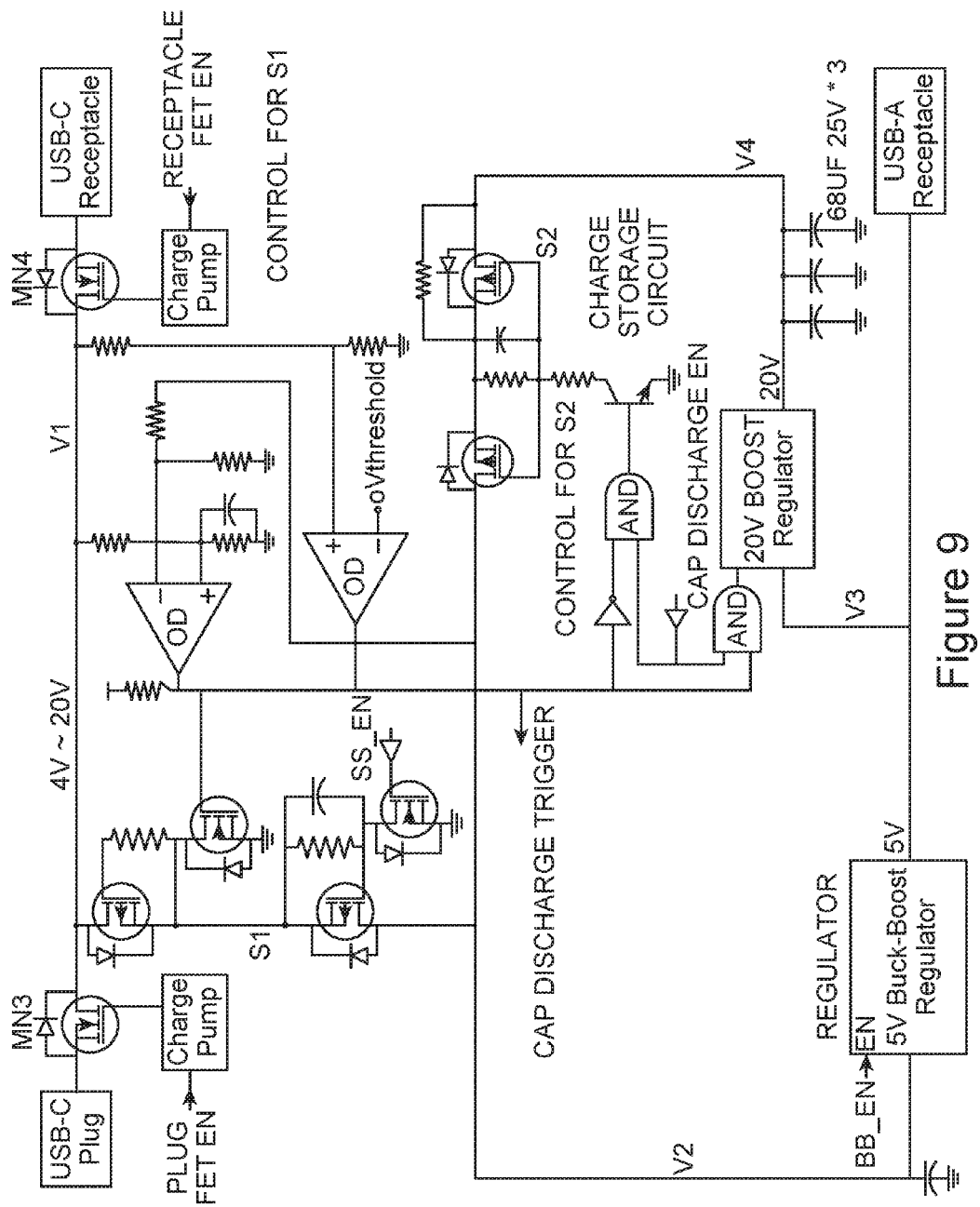
FIG. 9 illustrates a circuit for a dongle according to an embodiment of the present invention.

FIG. 9 illustrates a circuit for a dongle according to an embodiment of the present invention. In this example, the previous schematics for switches S1 and S2, control circuitry for switch S1, and circuitry for the charge storage circuit are included. Additional transistors MN3 and MN4 are included. Transistors MN3 and MN4 may be shut off to disconnect connections to the plug 122 and receptacle 126.

Figure 10:
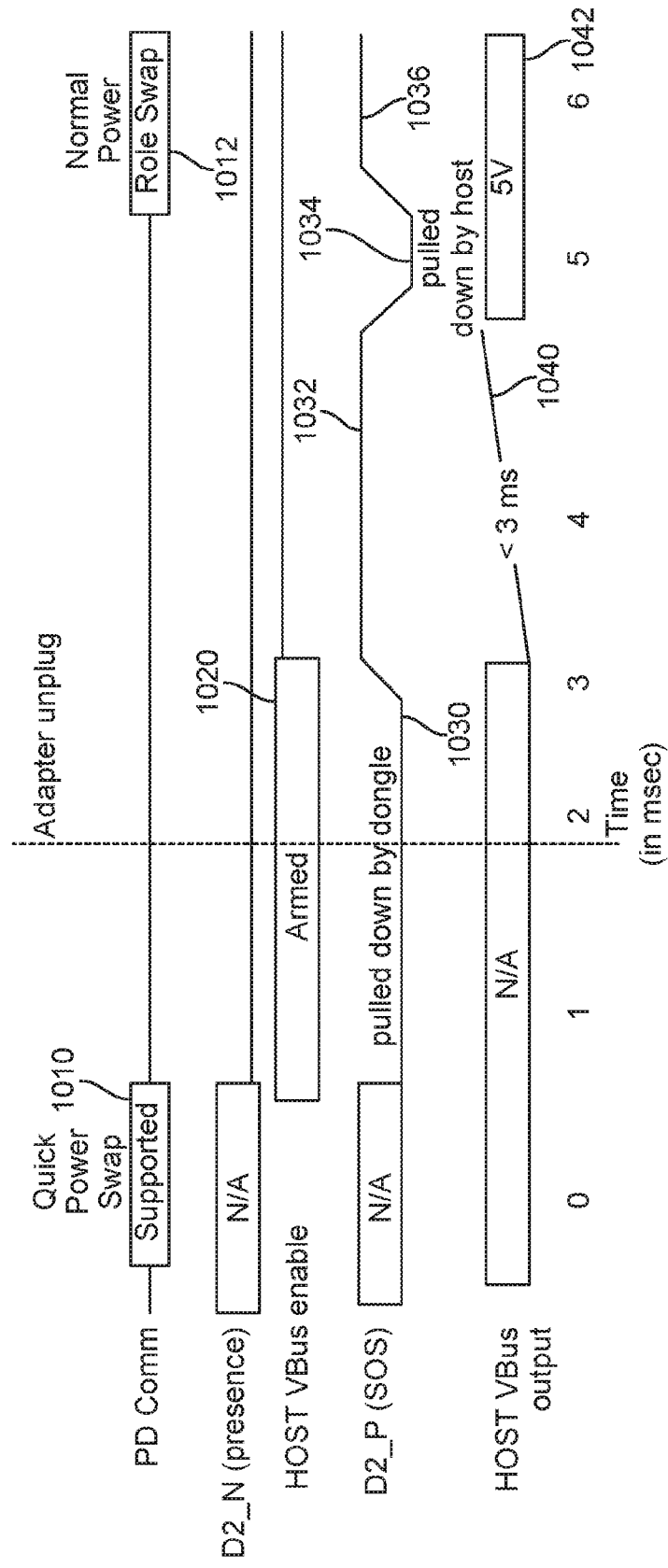
FIG. 10 is a timing diagram illustrating an operation of an electronic system according to an embodiment of the present invention.

FIG. 10 is a timing diagram illustrating an operation of an electronic system according to an embodiment of the present invention. Initially, power delivery communications may be conducted at stage 1010. At this time, a host device and dongle may determine that each are capable of carrying out their role in a quick power swap technique according to an embodiment of the present invention. At stage 1020, a host device may enable a regulator that may be used to provide power in the event of a charger disconnection. A power adapter or charger may be unplugged from the dongle, as shown by the adapter unplug event. The dongle may signal to the host that such a disconnection has occurred at the start of state 1032. During this time, the host may begin to prepare to provide power to the dongle, and the dongle may provide power using a charge storage circuit. At 1034, the host device may pull down on the SOS line indicating the dongle may use power supplied by the host. The host may provide power at stage 1042. At stage 1012, if necessary, the host and dongle may negotiate for a power level to be provided by the host to the dongle.

Embodiments of the present invention may provide dongles or adapters that may be connected to or between various types of devices, such as portable computing devices, tablet computers, desktop computers, laptops, all-in-one computers, wearable computing devices, cell phones, smart phones, media phones, storage devices, portable media players, navigation systems, monitors, power supplies, adapters, remote control devices, chargers, and other devices.

These dongles or adapters may include plugs and receptacles that provide pathways for signals that are compliant with various standards such as Universal Serial Bus (USB) including USB-C, High-Definition Multimedia Interface® (HDMI), Digital Visual Interface (DVI), Ethernet, DisplayPort, VGA, Thunderbolt™, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future. Other embodiments of the present invention may provide connector receptacles and inserts or plugs that may be used to provide a reduced set of functions for one or more of these standards. In various embodiments of the present invention, these interconnect paths provided by these connector receptacles and inserts or plugs may be used to convey power, ground, signals, test points, and other voltage, current, data, or other information.

In various embodiments of the present invention, contacts and other conductive portions of these dongles or adapters may be formed by plating, depositing, stamping, metal-injection molding, machining, micro-machining, 3-D printing, or other manufacturing process. The conductive portions may be formed of stainless steel, steel, copper, copper titanium, phosphor bronze, gold, or other material or combination of materials. They may be plated or coated with nickel, gold, or other material. The nonconductive portions, such as the housings cable insulation, may be formed using injection or other molding, 3-D printing, machining, or other manufacturing process. The nonconductive portions may be formed of silicon or silicone, rubber, hard rubber, plastic, nylon, liquid-crystal polymers (LCPs), or other nonconductive material or combination of materials.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A dongle comprising:
a first plug to couple to a host device receptacle on a host device;
a housing coupled to the first plug;
a first receptacle in the housing to receive a second plug coupled to a charger;
a second receptacle in the housing to receive a third plug coupled to an accessory;
a first regulator having an output coupled to a power supply terminal in the second receptacle;
a first switch having a first terminal coupled to a power supply terminal in the first plug and a power supply terminal in the first receptacle and a second terminal coupled to an input of the first regulator;
a charge storage circuit having an input coupled to the output of the first regulator; and
a second switch having a first terminal coupled to an output of the charge storage circuit and a second terminal coupled to the second terminal of the first switch and the first regulator.

2. The dongle of claim 1 wherein when the charger provides power to the first terminal of the first switch, the first switch is closed and the second switch is opened.

3. The dongle of claim 2 wherein when the charger provides power to the first terminal of the first switch, the charger provides power to the first regulator, and the first regulator provides power to the accessory via the power supply terminal in the second receptacle.

4. The dongle of claim 3 wherein when the charger is removed by a user after the charger has supplied power to the first terminal of the first switch, the first switch opens and the second switch closes.

5. The dongle of claim 4 wherein when the charger is removed by a user after the charger has supplied power to the first terminal of the first switch, then, for a first period of time, the charge storage circuit provides power to the first regulator, and the first regulator provides power to the accessory via the power supply terminal in the second receptacle.

6. The dongle of claim 5 wherein after the first period of time, the first switch closes and the second switch opens.

7. The dongle of claim 6 wherein after the first period of time, the host device provides power to the first regulator via the power supply terminal in the first plug.

8. The dongle of claim 1 wherein the charge storage circuit comprises a second regulator having an output coupled to a capacitor.

9. The dongle of claim 1 wherein the charge storage circuit comprises a second regulator having an output coupled to a plurality of capacitors.

10. The dongle of claim 9 wherein the second regulator is a boost regulator.

11. A method of providing power to an accessory using a dongle, the method comprising, with the dongle:
receiving power at a first receptacle and using the power received at the first receptacle to provide power to a first plug and a second receptacle, and to charge a charge storage circuit in the dongle;
detecting that the power received at the first receptacle is no longer being received; then
providing a signal to the first plug that power is not being received at the first receptacle;
providing power to the second receptacle using the charge storage circuit; then, after a first duration; and
receiving power at the first plug and using the power received at the first plug to provide power to the second receptacle.

12. The method of claim 11 further comprising:
before detecting that the power received at the first receptacle is not being received, determining that a host device connected to the first plug is capable of providing a power supply voltage within the first duration.

13. The method of claim 12 wherein providing a signal to the first plug that power is not being received at the first receptacle comprises providing a signal using a low-speed data line.

14. The method of claim 13 further comprising:
after the first duration, receiving a signal indicating that the power received at the first plug may be used to provide power to the second receptacle.

15. The method of claim 14 further comprising:
after receiving power at the first plug, determining a power level that may be provided by the host device via the first plug.

16. The method of claim 14 further comprising:
before detecting that the power received at the first receptacle is not being received, determining a power level that may be provided by the host device via the first plug.

17. An electronic system comprising:
a host device having a receptacle; and
a dongle having a plug to mate with the receptacle on the host device, the plug connected to a housing of the dongle, the housing having a first receptacle to connect to a charger and a second receptacle to connect to an accessory, the dongle further comprising:
a first switch to couple a power supply received at the first receptacle to the second receptacle;
detect circuitry to detect that the power supply received at the first receptacle is no longer being received and to send a signal to the host device indicating that the power supply received at the first receptacle is no longer being received; and
a second switch to couple a charge storage circuit to provide a power supply to the second receptacle,
wherein the host device further comprises:
logic to receive the signal from the dongle indicating that the power supply received at the first receptacle of the dongle is no longer being received and to provide a power supply to the plug of the dongle within a first duration, and
wherein the first switch of the dongle couples the power supply received from the host device on the plug to the second receptacle.

18. The electronic system of claim 17 wherein the host device is further configured to determine that the dongle is capable of providing a power supply for a first duration, and the dongle is further configured to determine that the host device is capable of providing a power supply voltage within the first duration.

19. The electronic system of claim 17 wherein the first switch provides power from the host device and the charger via a first voltage regulator.

20. The electronic system of claim 19 wherein the charge storage circuit comprises a second voltage regulator having an output coupled to a capacitor.

* * * * *